United States Patent
Al-Zhrani et al.

(10) Patent No.: US 10,882,937 B2
(45) Date of Patent: Jan. 5, 2021

(54) POLYMER HAVING A SMALL AVERAGE PARTICLE SIZE

(71) Applicant: SABIC GLOBAL TECHNOLOGIES B.V., Bergen op Zoom (NL)

(72) Inventors: Attyah Saeed Al-Zhrani, Riyadh (SA); Mohammed Zerfa, Riyadh (SA); Faisal Alhareeki, Riyadh (SA)

(73) Assignee: SABIC GLOBAL TECHNOLOGIES B.V., Bergen op Zoom (NL)

(*) Notice: Subject to any disclaimer, the term of this patent is extended or adjusted under 35 U.S.C. 154(b) by 230 days.

(21) Appl. No.: 16/312,040

(22) PCT Filed: Jun. 21, 2017

(86) PCT No.: PCT/EP2017/065166
§ 371 (c)(1),
(2) Date: Dec. 20, 2018

(87) PCT Pub. No.: WO2018/001805
PCT Pub. Date: Jan. 4, 2018

(65) Prior Publication Data
US 2019/0375868 A1 Dec. 12, 2019

(30) Foreign Application Priority Data

Jun. 30, 2016 (EP) .................................. 16177049
Jun. 30, 2016 (EP) .................................. 16177051

(51) Int. Cl.
*C08F 220/26* (2006.01)
*C08L 29/04* (2006.01)
*C08L 27/06* (2006.01)
*C08K 5/00* (2006.01)
*C08F 220/28* (2006.01)

(52) U.S. Cl.
CPC .......... *C08F 220/26* (2013.01); *C08K 5/0016* (2013.01); *C08L 27/06* (2013.01); *C08L 29/04* (2013.01); *C08F 220/282* (2020.02); *C08F 2800/20* (2013.01); *C08L 2201/54* (2013.01); *C08L 2205/14* (2013.01)

(58) Field of Classification Search
CPC .... C08F 220/26; C08F 2800/20; C08L 29/04; C08L 2201/54; C08L 2205/14; C08L 27/06; C08K 5/0016
See application file for complete search history.

(56) References Cited

U.S. PATENT DOCUMENTS

| 4,319,012 A * | 3/1982 | Morningstar ........... C08F 14/06 526/202 |
| 5,244,995 A | 9/1993 | Skillicorn et al. |
| 2007/0078217 A1 | 4/2007 | Kim et al. |
| 2012/0095176 A1 * | 4/2012 | Hiermeier ............. C08F 114/06 526/199 |
| 2016/0362578 A1 * | 12/2016 | Reynoso Gomez .... C08L 33/14 |

OTHER PUBLICATIONS

International Search Report for International Application No. PCT/EP2017/065166; International Filing Date: Jun. 21, 2017; dated Aug. 18, 2017; 11 pages.
Written Opinion for International Application No. PCT/EP2017/065166; International Filing Date: Jun. 21, 2017; dated Aug. 18, 2017; 6 pages.

* cited by examiner

*Primary Examiner* — Doris L Lee
(74) *Attorney, Agent, or Firm* — Cantor Colburn LLP

(57) ABSTRACT

The present invention relates to a polymer comprising: (a) polymeric units derived from vinyl chloride, vinyl acetate, styrene, methyl methacrylate, acrylonitrile, or combinations thereof; and (b) polymeric units derived from one or more compounds according to formula I: wherein: R1 is $CH_3$ or H; R2 is a moiety comprising 1-20 carbon atoms; and n is an integer from 1-10; wherein the polymer has an average particle size of 10-80 μm expressed as $D_{50}$ determined in accordance with ISO 9276-2 (2014); and a porosity of ≤0.20 ml/g as determined as the quantity of di(2-ethylhexyl) phthalate in ml absorbed by 1 g of polymer upon subjecting the polymer at 23° C. to vacuum, submerging in di(2-ethylhexyl)phthalate for 10 min, and subsequently centrifuging at 2000 rpm for 45 min. Such polymer may be used as viscosity reducing agent in PVC plastisol compositions.

17 Claims, No Drawings

POLYMER HAVING A SMALL AVERAGE PARTICLE SIZE

CROSS REFERENCE TO RELATED APPLICATIONS

This application is a National Stage application of PCT/EP2017/065166, filed Jun. 21, 2017, which claims the benefit of Europe Application No. 16177049.0, filed Jun. 30, 2016, and Europe Application No, 16177051.6, filed Jun. 30, 2016, all of which are incorporated by reference in their entirety herein.

The present invention relates to a polymer having small average particle size. The invention also relates to a process for the production of such polymer. The invention further relates to the use of such polymer.

Polymers such as polyvinyl chloride polymers are well known polymers that have found their use in a wide variety of applications. One such application is in plastisols. Plastisols are compositions that are viscous liquids under atmospheric conditions, but when subjected to a certain temperature treatment by heating and cooling will convert to a solid shape. Such plastisols commonly comprise a polyvinylchloride (PVC) polymer and a plasticiser.

In order for the plastisol composition to be have a suitable viscosity under shaping conditions so as to avoid defects occurring, as well as sufficiently fast to allow an economic processing, viscosity reducing agents may need to be added to the plastisol composition. The PVC polymer used for the plastisol composition commonly has an average particle size in the range of for example 1-20 µm. Such PVC polymers are obtained via most common production processes for PVC, including for example emulsion polymerisation and micro-suspension polymerisation. Such processes are for example described in Nexant Chemsystems report PERP 2012-8. However, use of such PVC in plastisols results in a viscosity that is too high for the shaping process. A common solution to reduce the viscosity is to add a fraction of a polymer having a certain small average particle size, such as for example an average particle size of 10-80 µm. In the context of the present invention, the average particle size is to be understood to be the particle size $D_{50}$ as determined in accordance with ISO 9276-2 (2014).

Such polymers for example are described in US20120095176. However, a disadvantage of the polymers described in US20120095176 is that in the production thereof, additional monomer feeding is required.

Currently, there is a need to provide polymers that may be used as viscosity reducing agents for plastisol compositions that are compatible with the polyvinylchloride polymer in the plasticiser composition. In particular, there is a need to provide such polymers that may be produced using conventional polymerisation processes such as suspension polymerisation processes.

This has now been achieved according to the present invention by a polymer comprising:
  (a) polymeric units derived from monomers selected from vinyl chloride, vinyl acetate, styrene, methyl methacrylate, acrylonitrile, or combinations thereof; and
  (b) polymeric units derived from one or more comonomers according to formula I:

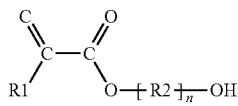

formula I
wherein:
  R1 is $CH_3$ or H;
  R2 is a moiety comprising 1-20 carbon atoms; and
  n is an integer from 1-10;

wherein the polymer has
  an average particle size of 10-80 µm expressed as $D_{50}$ determined in accordance with ISO 9276-2 (2014); and
  a porosity of ≤0.20 ml/g as determined as the quantity of di(2-ethylhexyl)phthalate in ml absorbed by 1 g of polymer upon subjecting the polymer at 23° C. to vacuum, submerging in di(2-ethylhexyl)phthalate for 10 min, and subsequently centrifuging at 2000 rpm for 45 min.

Such polymers show a high viscosity reducing activity when used in plastisol compositions.

The comonomers according to formula I are believed to interact with the monomers selected from vinyl chloride, vinyl acetate, styrene, methyl methacrylate, acrylonitrile, or combinations thereof in such way during the polymerisation that a suspension of fine droplets is formed where the comonomers are positioned on the surface of the droplets, and wherein the monomers are to a certain degree contained within the droplets. During polymerisation, the monomers and comonomers react to form polymer particles having such dimensions rendering them particularly suitable for use as viscosity reducing agent in plastisol compositions.

In a preferred embodiment, R1 is $CH_3$. In another preferred embodiment, R2 comprises at least one hydroxyl moiety, more preferably R2 comprises at least two hydroxyl moieties, more preferably R2 comprises at least one hydroxyl moiety and n is 1.

R2 may for example be selected from:
  —$CH_2$—,
  —$CH_2$—$CH_2$—,
  —$CH_2$—$CH(CH_3)$—,
  —$CH_2$—$CH_2$—$CH_2$,
  —$CH_2$—$CH(OH)$—$CH_2$-,
  —$CH_2$—$(CH(OH))_2$—$CH_2$—,
  —$CH_2$—$(CH(OH))_3$—$CH_2$—,
  —$CH_2$—$(CH(OH))_4$—$CH_2$—,
  —O—$CH_2$—$CH_2$—[—O—$CH_2$—$CH_2$—]$_m$—, or
  —O—$CH_2$—$CH_2$—$CH_2$—[—O—$CH_2$—$CH_2$—$CH_2$—]$_m$—
  where m is an integer from 1-10.
  For example, R2 is —$CH_2$—$CH(OH)$—$CH_2$—.
  Preferably, R1 is $CH_3$ and R2 is selected from:
  —$CH_2$—,
  —$CH_2$—$CH_2$—,
  —$CH_2$—$CH(CH_3)$—,
  —$CH_2$—$CH_2$—$CH_2$—,
  —$CH_2$—$CH(OH)$—$CH_2$—,
  —$CH_2$—$(CH(OH))_2$—$CH_2$—,
  —$CH_2$—$(CH(OH))_3$—$CH_2$—,
  —$CH_2$—$(CH(OH))_4$—$CH_2$—,
  —O—$CH_2$—$CH_2$—[—O—$CH_2$—$CH_2$—]$_m$—, or
  —O—$CH_2$—$CH_2$—$CH_2$—[—O—$CH_2$—$CH_2$—$CH_2$—]$_m$—
  where m is an integer from 1-10.
  Preferably, R1 is $CH_3$ and R2 is —$CH_2$—$CH(OH)$—$CH_2$—.

The viscosity reducing activity in plastisol compositions is further believed to be related to the particle shape of the polymer. In particular, it is believed that polymers of which the particles are highly spherical have a high viscosity reducing activity. An indicator for the degree of spherical shape of the polymer particles is believed to be the bulk density of the polymer. A higher bulk density is believed to reflect a higher degree of spherical shape of the polymer particles. A further effect of the polymers according to the present invention is that the quantity of plasticiser in the plastisol compositions may be reduce whilst achieving a similar viscosity. It is believed that the use of a quantity of the polymer in plastisol compositions may lead to a reduction of the viscosity of the plastisol of up to 60%.

The average particle size of the polymer according to the invention is 10-80 μm expressed as $D_{50}$ determined in accordance with ISO 9276-2 (2014). For example the average particle size may be ≥25 μm and ≤80 μm, alternatively ≤35 μm and ≤70 μm.

The porosity of the polymer according to the invention is ≤0.20 ml/g as determined as the quantity of di(2-ethylhexyl) phthalate in ml absorbed by 1 g of polymer upon subjecting the polymer at 23° C. to vacuum, submerging in di(2-ethylhexyl)phthalate for 10 min, and subsequently centrifuging at 2000 rpm for 45 min. Preferably, the porosity is ≤0.15 ml/g, more preferably ≤0.10 ml/g.

In a further preferred embodiment, the polymer according to the invention comprises ≥500 ppm of units (b), with regard to the total weight of the polymer. More preferably, the polymer comprises ≥2000 ppm of units (b), alternatively ≥4000 ppm or ≥6000 ppm of units (b). The polymer may for example comprise ≤20000 ppm, preferably ≤15000 ppm of units (b). For example, the polymer may comprise ≥2000 and ≤20000 ppm of units (b), more preferably ≥4000 and ≤15000 ppm.

It is also preferred that the polymeric units (a) are derived from vinyl chloride, styrene, methyl methacrylate, or combinations thereof. Even more preferably, the polymeric units (a) are derived from vinyl chloride.

In a particular embodiment of the invention, the polymeric units (b) are derived from one or more compounds selected from glycerol (meth)acrylate, 2-hydroxyethyl (meth)acrylate, 2-hydroxypropyl (meth)acrylate, tetritol mono(meth)acrylate, xylitol mono(meth)acrylate, sorbitol mono(meth)acrylate, polyethyleneglycol (meth)acrylate, polypropyleneglycol (meth)acrylate, or combinations thereof. It is even further preferred that the polymeric units (b) are derived from one or more compounds selected from glycerol (meth)acrylate, 2-hydroxyethyl (meth)acrylate, 2-hydroxypropyl (meth)acrylate, or combinations thereof. It is particularly preferred that the polymeric units (b) are derived from glycerol (meth)acrylate. For example, the polymer according to the invention may comprise ≥2000 ppm of units (b), with regard to the total weight of the polymer, where the polymeric units (b) may be derived from one or more compounds selected from glycerol (meth) acrylate, 2-hydroxyethyl (meth)acrylate, 2-hydroxypropyl (meth)acrylate, tetritol mono(meth)acrylate, xylitol mono (meth)acrylate, sorbitol mono(meth)acrylate, polyethyleneglycol (meth)acrylate, polypropyleneglycol (meth)acrylate, or combinations thereof. In a further example, the polymer according to the invention may comprise ≥2000 ppm of units (b), with regard to the total weight of the polymer, where the polymeric units (b) may be derived from glycerol (meth)acrylate, 2-hydroxyethyl (meth)acrylate, 2-hydroxypropyl (meth)acrylate, or combinations thereof. In yet another example, the polymer according to the invention may comprise ≥2000 ppm, alternatively ≥4000 ppm of units (b), with regard to the total weight of the polymer, where the polymeric units (b) may be derived from glycerol (meth) acrylate. The polymer may for example comprise ≤20000 ppm, preferably ≤15000 ppm of units (b), where the polymeric units (b) may be derived from glycerol (meth)acrylate. For example, the polymer may comprise ≥2000 and ≤20000 ppm of units (b), more preferably ≥4000 and ≤15000 ppm, where the polymeric units (b) may be derived from glycerol (meth)acrylate.

The production of the polymer according to the present invention preferably takes place via a suspension polymerisation process. Such suspension polymerisation process may for example be operated at a pressure of 5-10 bar, preferably 7-9 bar. Such suspension polymerisation process may for example be operated at a temperature of 20-70° C., preferably 50-60° C. Such suspension polymerisation processes may for example be performed during a reaction period of 200-500 min, preferably 300-400 min. In suitable suspension processes, the polymerisation may take place by reaction of a reaction mixture comprising:

a quantity of a reaction medium;
a quantity of vinyl chloride, vinyl acetate, styrene, methyl methacrylate, acrylonitrile, or combinations thereof; and
a quantity of a one or more compounds according to formula I or II.

An initiator composition comprising one or more initiators may be added to the reaction mixture. The initiator composition may for example comprise one or more peroxides or azo compounds. Such peroxide may for example be selected from di(2-ethylhexyl)peroxydicarbonate, 3-hydroxy-1,1-dimethylbutyl peroxyneodecanoate, t-butylperoxy pivalate, t-amylperoxy pivalate, 1,1,3,3-tetramethylbutyl peroxyneodecanoate, t-amylperoxy neodecanoate, t-butylperoxy neodecanoate, or combinations thereof. The initiator composition may for example be added in a quantity of ≥100 ppm, alternatively ≥200 ppm, alternatively ≥500 ppm with regard to the weight of the quantity of vinyl chloride, vinyl acetate, styrene, methyl methacrylate, acrylonitrile, or combinations thereof. The initiator composition may for example be added in a quantity of ≤2000 ppm, alternatively ≤1000 ppm. For example, the initiator composition may be added in a quantity of ≥200 ppm and ≤2000 ppm, alternatively ≥500 ppm and ≤1000 ppm.

In a certain embodiment, the polymer is produced by a suspension polymerisation process comprises reacting a reaction mixture comprising:

a quantity of a reaction medium;
a quantity of vinyl chloride, vinyl acetate, styrene, methyl methacrylate, acrylonitrile, or combinations thereof; and
a quantity of a one or more compounds selected from glycerol (meth)acrylate, 2-hydroxyethyl (meth)acrylate, 2-hydroxypropyl (meth)acrylate, tetritol mono (meth)acrylate, xylitol mono(meth)acrylate, sorbitol mono(meth)acrylate, polyethyleneglycol (meth)acrylate, polypropyleneglycol (meth)acrylate, or combinations thereof.

The production of the polymer according to the present invention via suspension polymerisation using a quantity of a one or more compounds selected from glycerol (meth) acrylate, 2-hydroxyethyl (meth)acrylate, 2-hydroxypropyl (meth)acrylate, tetritol mono(meth)acrylate, xylitol mono (meth)acrylate, sorbitol mono(meth)acrylate, polyethyleneglycol (meth)acrylate, polypropyleneglycol (meth)acrylate, or combinations thereof has as one of its advantages that there is no need for the preparation of a solution prior to introduction into the reactor as these compounds are stable at room temperature.

The suspension polymerisation process to produce the polymer according to the present invention may in a more specific embodiment comprise reacting a reaction mixture comprising:

a quantity of a reaction medium;

a quantity of vinyl chloride, vinyl acetate, styrene, methyl methacrylate, acrylonitrile, or combinations thereof; and a quantity of ≥500 ppm by weight, with regard to the weight of the quantity of vinyl chloride, vinyl acetate, styrene, methyl methacrylate, acrylonitrile, or combinations thereof, of a one or more compounds selected from glycerol (meth)acrylate, 2-hydroxyethyl (meth)acrylate, 2-hydroxypropyl (meth)acrylate, tetritol mono(meth)acrylate, xylitol mono(meth)acrylate, sorbitol mono(meth)acrylate, polyethyleneglycol (meth)acrylate, polypropyleneglycol (meth)acrylate, or combinations thereof.

Particularly, the suspension polymerisation process may comprise reacting a reaction mixture comprising:

a quantity of a reaction medium;

a quantity of vinyl chloride; and a quantity of ≥500 ppm by weight, with regard to the weight of the quantity of vinyl chloride, of a glycerol (meth)acrylate.

The reaction medium preferably is water, more preferably demineralized water.

The reaction mixture using in the process for the production of the polymer according to the invention may further comprise one or more suspending agents. Such suspending agents may for example include polyvinyl alcohols, cellulosics, and polyvinyl acetates. Such polyvinyl alcohols may for example be polyvinyl alcohols having a degree of hydrolysis of 50-90 mol %.

For example, a composition comprising different polyvinyl alcohols, for example a polyvinyl alcohol having a degree of hydrolysis of 70-75 mol % and a polyvinyl alcohol having a degree of hydrolysis of 85-90 mol %, may be used as suspending agent. Alternatively, a composition comprising a polyvinyl alcohol having a degree of hydrolysis of 70-75 mol %, a polyvinyl alcohol having a degree of hydrolysis of 85-90 mol %, and hydroxypropyl methyl cellulose may be used as suspending agent. Alternatively, a composition comprising a polyvinyl alcohol having a degree of hydrolysis of 50-60 mol %, a polyvinyl alcohol having a degree of hydrolysis of 70-75 mol %, a polyvinyl alcohol having a degree of hydrolysis of 85-90 mol %, and hydroxypropyl methyl cellulose may be used as suspending agent. Such suspending agent may for example be added to the reaction medium in a quantity of 2000-15000 ppm with regard to the weight of the quantity of vinyl chloride, vinyl acetate, styrene, methyl methacrylate, acrylonitrile, or combinations thereof; alternatively, the suspending agent may be added in a quantity of 2000-5000 ppm.

The degree of hydrolysis of the polyvinyl alcohols (PVA) may for example be determined in accordance with ISO 15023-2 (2003).

The present invention also relates to the use of the polymer according to the invention as viscosity reducing agent in plastisol compositions. Further, the invention relates to a plastisol composition comprising a polymer according to the invention and a polyvinyl chloride polymer having an average particle size of 1-20 μm. Also, the invention relates to a plastisol composition comprising 10.0-30.0 wt %, alternatively 15.0-25.0 wt %, of the polymer according to the invention with regard to the total weight of the plastisol composition.

One of the particular embodiments of the invention relates to a polymer comprising:

(a) polymeric units derived from vinyl chloride, vinyl acetate, styrene, methyl methacrylate, acrylonitrile, or combinations thereof; and (b) ≥4000 and ≤15000 ppm of polymeric units derived from glycerol (meth)acrylate, tetritol mono(meth)acrylate, xylitol mono(meth)acrylate, sorbitol mono(meth)acrylate, or combinations thereof, with regard to the total weight of the polymer wherein the polymer has an average particle size of 10-80 μm expressed as $D_{50}$ determined in accordance with ISO 9276-2 (2014); and a porosity of ≤0.20 ml/g as determined as the quantity of di(2-ethylhexyl)phthalate in ml absorbed by 1 g of polymer upon subjecting the polymer at 23° C. to vacuum, submerging in di(2-ethylhexyl)phthalate for 10 min, and subsequently centrifuging at 2000 rpm for 45 min.

Another one of the particular embodiments of the invention relates to a polymer comprising:

(a) polymeric units derived from vinyl chloride; and (b) ≥4000 and ≤15000 ppm of polymeric units derived from glycerol (meth)acrylate, tetritol mono(meth)acrylate, xylitol mono(meth)acrylate, sorbitol mono(meth)acrylate, or combinations thereof, with regard to the total weight of the polymer wherein the polymer has an average particle size of 10-80 μm expressed as $D_{50}$ determined in accordance with ISO 9276-2 (2014); and a porosity of ≤0.20 ml/g as determined as the quantity of di(2-ethylhexyl)phthalate in ml absorbed by 1 g of polymer upon subjecting the polymer at 23° C. to vacuum, submerging in di(2-ethylhexyl)phthalate for 10 min, and subsequently centrifuging at 2000 rpm for 45 min.

Yet another one of the particular embodiments of the invention relates to a polymer comprising:

(a) ≥95.0 wt % of polymeric units derived from vinyl chloride, with regard to the total weight of the polymer; and (b) ≥4000 and ≤15000 ppm of polymeric units derived from glycerol (meth)acrylate, tetritol mono(meth)acrylate, xylitol mono(meth)acrylate, sorbitol mono(meth)acrylate, or combinations thereof, with regard to the total weight of the polymer wherein the polymer has an average particle size of 10-80 μm expressed as $D_{50}$ determined in accordance with ISO 9276-2 (2014); and a porosity of ≤0.20 ml/g as determined as the quantity of di(2-ethylhexyl)phthalate in ml absorbed by 1 g of polymer upon subjecting the polymer at 23° C. to vacuum, submerging in di(2-ethylhexyl)phthalate for 10 min, and subsequently centrifuging at 2000 rpm for 45 min.

Another further particular embodiment of the invention relates to a polymer comprising:

(c) ≥95.0 wt % of polymeric units derived from vinyl chloride, with regard to the total weight of the polymer; and (d) ≥4000 and ≤15000 ppm of polymeric units derived from glycerol (meth)acrylate, with regard to the total weight of the polymer wherein the polymer has
an average particle size of 10-80 µm expressed as $D_{50}$ determined in accordance with ISO 9276-2 (2014); and
a porosity of ≤0.20 ml/g as determined as the quantity of di(2-ethylhexyl)phthalate in ml absorbed by 1 g of polymer upon subjecting the polymer at 23° C. to vacuum, submerging in di(2-ethylhexyl)phthalate for 10 min, and subsequently centrifuging at 2000 rpm for 45 min.

In a particularly preferred embodiment, the present invention relates to a polymer comprising:
(a) polymeric units derived from vinyl chloride; and
(b) polymeric units derived from glycerol (meth)acrylate, tetritol mono(meth)acrylate, xylitol mono(meth)acrylate, sorbitol mono(meth)acrylate, or combinations thereof;
wherein the polymer has
an average particle size of 10-80 µm expressed as $D_{50}$ determined in accordance with ISO 9276-2 (2014); and
a porosity of ≤0.20 ml/g as determined as the quantity of di(2-ethylhexyl)phthalate in ml absorbed by 1 g of polymer upon subjecting the polymer at 23° C. to vacuum, submerging in di(2-ethylhexyl)phthalate for 10 min, and subsequently centrifuging at 2000 rpm for 45 min.
wherein the polymer is produced in a suspension polymerisation process comprising reacting a reaction mixture comprising:
a quantity of a reaction medium;
a quantity of vinyl chloride; and
a quantity of ≥2000 ppm by weight, with regard to the weight of the quantity of vinyl chloride, of glycerol (meth)acrylate.
wherein the suspension polymerisation process may for example be operated at a pressure of 5-10 bar, a temperature of 20-70° C. and during a reaction period of 200-500 min.

In a further particularly preferred embodiment, the present invention relates to a polymer comprising:
(a) polymeric units derived from vinyl chloride; and
(b) polymeric units derived from glycerol (meth)acrylate
wherein the polymer has
an average particle size of ≤70 µm expressed as $D_{50}$ determined in accordance with ISO 9276-2 (2014); and
a porosity of ≤0.15 ml/g as determined as the quantity of di(2-ethylhexyl)phthalate in ml absorbed by 1 g of polymer upon subjecting the polymer at 23° C. to vacuum, submerging in di(2-ethylhexyl)phthalate for 10 min, and subsequently centrifuging at 2000 rpm for 45 min.
wherein the polymer is produced in a suspension polymerisation process comprising reacting a reaction mixture comprising:
a quantity of a reaction medium;
a quantity of vinyl chloride; and
a quantity of ≥5000 ppm by weight, with regard to the weight of the quantity of vinyl chloride, of glycerol (meth)acrylate.
wherein the suspension polymerisation process may for example be operated at a pressure of 7-9 bar, a temperature of 50-60° C. and during a reaction period of 300-400 min.

In another further particularly preferred embodiment, the present invention relates to a polymer comprising:
(a) polymeric units derived from vinyl chloride; and
(b) polymeric units derived from glycerol (meth)acrylate
wherein the polymer has
an average particle size of ≤70 µm expressed as $D_{50}$ determined in accordance with ISO 9276-2 (2014); and
a porosity of ≤0.15 ml/g as determined as the quantity of di(2-ethylhexyl)phthalate in ml absorbed by 1 g of polymer upon subjecting the polymer at 23° C. to vacuum, submerging in di(2-ethylhexyl)phthalate for 10 min, and subsequently centrifuging at 2000 rpm for 45 min.
wherein the polymer is produced in a suspension polymerisation process comprising reacting a reaction mixture comprising:
a quantity of a reaction medium;
a quantity of vinyl chloride; and
a quantity of ≥5000 and ≤15000 ppm by weight, with regard to the weight of the quantity of vinyl chloride, of glycerol (meth)acrylate.
wherein the suspension polymerisation process may for example be operated at a pressure of 7-9 bar, a temperature of 50-60° C. and during a reaction period of 300-400 min.

The present invention will now be illustrated by the following non-limiting examples.

Polymerisation experiments were performed in a stainless steel closed reactor having a volume of 4.35 l. The reactor was equipped with an agitator with two blades and four baffles. Water was used as reaction medium. In each experiment, 2100 g of water, mixed with a quantity of suspending agents and comonomers as listed in table 1, was introduced into the reactor.

TABLE 1

| Suspending agents and comonomers | | | | | |
|---|---|---|---|---|---|
| Experiment | PVA72 | PVA88 | PVA55 | MC | GMA |
| 1 | 0 | 800 | 0 | 0 | 10993 |
| 2 | 0 | 1050 | 0 | 120 | 5666 |
| 3(C) | 1200 | 800 | 250 | 120 | 0 |
| 4(C) | 1200 | 800 | 250 | 120 | 10993 |

The quantities in table 1 are expressed as ppm by weight with regard to the weight of the total quantity of vinyl chloride introduced to the reactor.

Experiments 1 and 2 present examples according to the present invention. Experiments 3 and 4 are included for comparative purposes.

The materials that were used in the experiments are:
PVA72: polyvinyl alcohol having a degree of hydrolysis of 72 mol %,
PVA88: polyvinyl alcohol having a degree of hydrolysis of 88 mol %,
PVA55: polyvinyl alcohol having a degree of hydrolysis of 55 mol %,
MC: hydroxypropyl methylcellulose
GMA: glycerol methacrylate, The degree of hydrolysis of the polyvinyl alcohol (PVA) may be determined in accordance with ISO 15023-2 (2003).

Sodium carbonate was introduced into the reactor as a buffer, in a quantity of 237 ppm with regard to the weight of the vinyl chloride. After charging the mixture of water, suspending agents and comonomers to the reactor, the atmosphere in the reactor above the reaction medium was purged with nitrogen three times. Subsequently, a vacuum was applied to the reactor, and kept for 5 minutes under agitation at 400 rpm. The agitator was stopped and 1500 g vinyl chloride was changed to the reactor. The agitator was started again and agitation was maintained at a speed of 900 rpm. The reactor contents were heated to 54° C. 200 ppm of di(2-ethylhexyl)peroxydicarbonate and 562 ppm 3-hydroxy-1,1'-dimethyl butyl peroxyneodecanoate with regard to the weight of the vinyl chloride were added as initiators to start the reaction. After 1 hour, further water dosing at a rate of 1.8 g/min was started to compensate the volume shrinkage due to the consumption of the vinyl chloride and the formation of the polyvinyl chloride polymer. After the polymerisation time of 350 min(examples 1 and 3) or 340 min (examples 2 and 4), reflecting a 80% conversion of vinyl chloride, the reactor was vented, and the reactor contents subjected to a temperature of 90° C. for 150 min to remove volatile components including unreacted vinyl chloride. Subsequently, the reaction medium was separated from the obtained polymer, and the polymer was dried in a fluidized bed dryer at 90° C. to obtain a PVC polymer comprising ≤0.3 wt % moisture.

The PVC polymer particles obtained in each of the experiments 1-4 were subjected to material properties testing. The obtained results are presented in table 2.

TABLE 2

Material properties of PVC obtained in experiments 1-4.

| Example | 1 | 2 | 3 (C) | 4 (C) |
|---|---|---|---|---|
| $D_{10}$ (μm) | 33 | 43 | 77 | 20 |
| $D_{50}$ (μm) | 61 | 71 | 142 | 33 |
| $D_{90}$ (μm) | 105 | 115 | 242 | 53 |
| Bulk density (g/cm$^3$) | 0.62 | 0.57 | 0.45 | |
| Porosity (ml/g) | 0.093 | 0.150 | 0.337 | 0.343 |
| Viscosity reducing activity | ++ | ++ | − | + |

Wherein:
$D_{10}$, $D_{50}$ and $D_{90}$ present the particle size dimension where respectively 10%, 50% and 90% by volume of the particles in the sample have a diameter of less than the presented value, as determined in accordance with ISO 9276-2 (2014);
Bulk density is determined in accordance with ASTM D-1895 96 (2010); and
Porosity is determined as the quantity of di(2-ethylhexyl)phthalate in ml absorbed by 1 g of polymer upon subjecting the polymer at 23° C. to vacuum, submerging in di(2-ethylhexyl)phthalate for 10 min, and subsequently centrifuging at 2000 rpm for 45 min.

From the examples presented above, it becomes apparent that polymers according to the present invention have a desirable high bulk density and a desirable good viscosity reducing activity when used in PVC plastisol compositions.

The invention claimed is:

1. A polymer comprising:
  (a) polymeric units derived from vinyl chloride, vinyl acetate, styrene, methyl methacrylate, acrylonitrile, or combinations thereof; and
  (b) polymeric units derived from one or more compounds according to formula I:

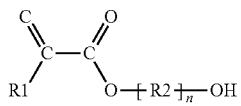

formula I
wherein:
  R1 is CH$_3$ or H;
  R2 is a moiety comprising 1-20 carbon atoms; and
  n is an integer from 1-10;

wherein the polymer has
  an average particle size of 10-80 μm expressed as $D_{50}$ determined in accordance with ISO 9276-2 (2014); and
  a porosity of ≤0.20 ml/g as determined as the quantity of di(2-ethylhexyl)phthalate in ml absorbed by 1 g of polymer upon subjecting the polymer at 23° C. to vacuum, submerging in di(2-ethylhexyl)phthalate for 10 min, and subsequently centrifuging at 2000 rpm for 45 min.

2. A polymer according to claim 1, wherein R2 is a moiety comprising at least one hydroxyl moiety.

3. A polymer according to claim 1, wherein the polymer comprises ≥500 ppm of units (b), with regard to the total weight of the polymer.

4. A polymer according to claim 1, wherein the polymeric units (a) are derived from vinyl chloride.

5. A polymer according to claim 1, wherein the polymeric units (b) are derived from one or more compounds selected from glycerol (meth)acrylate, 2-hydroxyethyl (meth)acrylate, 2-hydroxypropyl (meth)acrylate, tetritol mono(meth)acrylate, xylitol mono(meth)acrylate, sorbitol mono(meth)acrylate, polyethyleneglycol (meth)acrylate, polypropyleneglycol (meth)acrylate, or combinations thereof.

6. A polymer according to claim 1, wherein the polymeric units (b) are derived from glycerol (meth)acrylate.

7. A polymer according to claim 1, wherein the polymer is produced in a suspension polymerisation process.

8. A polymer according to claim 7, wherein the suspension polymerisation process comprises reacting a reaction mixture comprising:
  a quantity of a reaction medium;
  a quantity of vinyl chloride, vinyl acetate, styrene, methyl methacrylate, acrylonitrile, or combinations thereof; and
  a quantity of one or more compounds according to formula I:

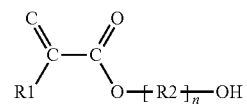

formula I
wherein:
  R1 is CH$_3$ or H;
  R2 is a moiety comprising 1-20 carbon atoms; and
  n is an integer from 1-10.

9. A polymer according to claim 7, wherein the suspension polymerisation process comprises reacting a reaction mixture comprising:
  a quantity of a reaction medium;
  a quantity of vinyl chloride, vinyl acetate, styrene, methyl methacrylate, acrylonitrile, or combinations thereof; and
  a quantity of one or more compounds selected from glycerol (meth)acrylate, 2-hydroxyethyl (meth)acrylate, 2-hydroxypropyl (meth)acrylate, tetritol mono(meth)acrylate, xylitol mono(meth)acrylate, sorbitol mono(meth)acrylate, polyethyleneglycol (meth)acrylate, polypropyleneglycol (meth)acrylate, or combinations thereof.

10. A polymer according to claim 7, wherein the suspension polymerisation process comprises reacting a reaction mixture comprising:
   a quantity of a reaction medium;
   a quantity of vinyl chloride, vinyl acetate, styrene, methyl methacrylate, acrylonitrile, or combinations thereof; and
   a quantity of ≥500 ppm by weight, with regard to the weight of the quantity of vinyl chloride, vinyl acetate, styrene, methyl methacrylate, acrylonitrile, or combinations thereof, of a one or more compounds selected from glycerol (meth)acrylate, 2-hydroxyethyl (meth)acrylate, 2-hydroxypropyl (meth)acrylate, tetritol mono(meth)acrylate, xylitol mono(meth)acrylate, sorbitol mono(meth)acrylate, polyethyleneglycol (meth)acrylate, polypropyleneglycol (meth)acrylate, or combinations thereof.

11. A polymer according to claim 7, wherein the suspension polymerisation process comprises reacting a reaction mixture comprising:
   a quantity of a reaction medium;
   a quantity of vinyl chloride; and
   a quantity of ≥500 ppm by weight, with regard to the weight of the quantity of vinyl chloride, of a glycerol (meth)acrylate.

12. A method of reducing a viscosity of a plastisol composition, comprising combining the polymer according to claim 1 with the plastisol compositions.

13. A plastisol composition comprising a polymer according to any claim 1 and a polyvinyl chloride polymer having an average particle size of 1-20 μm.

14. A plastisol composition comprising 10.0-30.0 wt % of the polymer according to claim 1 with regard to the total weight of the plastisol composition.

15. A plastisol composition according claim 14 further comprising a polyvinyl chloride polymer having an average particle size of 1-20 μm.

16. A plastisol composition according claim 14, wherein the polymeric units (a) are derived from vinyl chloride, and the polymeric units (b) are derived from one or more compounds selected from glycerol (meth)acrylate, 2-hydroxyethyl (meth)acrylate, 2-hydroxypropyl (meth)acrylate, tetritol mono(meth)acrylate, xylitol mono(meth)acrylate, sorbitol mono(meth)acrylate, polyethyleneglycol (meth)acrylate, polypropyleneglycol (meth)acrylate, or combinations thereof.

17. A polymer according to claim 16, wherein the polymeric units (b) are derived from glycerol (meth)acrylate.

* * * * *